United States Patent [19]

Yoshida et al.

[11] 4,332,073

[45] Jun. 1, 1982

[54] METHOD OF PRODUCING MULTIPLE-WALL COMPOSITE PIPES

[75] Inventors: Toshio Yoshida; Shigetomo Matsui, both of Kobe, Japan

[73] Assignee: Kawasaki Jukogyo Kabushiki Kaisha, Kobe, Japan

[21] Appl. No.: 124,215

[22] Filed: Feb. 25, 1980

[30] Foreign Application Priority Data

Feb. 28, 1979 [JP] Japan .................................. 54-23075
Feb. 28, 1979 [JP] Japan .................................. 54-23076
Feb. 28, 1979 [JP] Japan .................................. 54-23077

[51] Int. Cl.³ ............................................. B23P 17/00
[52] U.S. Cl. .................................. 29/421 R; 29/447; 29/523; 138/140
[58] Field of Search ................ 29/421 R, 447, 523; 138/140

[56] References Cited

U.S. PATENT DOCUMENTS

| | | | |
|---|---|---|---|
| 1,955,728 | 4/1934 | Allen et al. | 29/447 |
| 1,980,156 | 11/1934 | Emrick | 29/447 |
| 2,986,847 | 6/1961 | Sato | 29/447 X |
| 3,064,344 | 11/1962 | Arne | 29/447 X |
| 3,068,562 | 12/1962 | Long | 29/421 R |

Primary Examiner—Charlie T. Moon
Attorney, Agent, or Firm—Martin Smolowitz

[57] ABSTRACT

An outer pipe is diametrically expanded by heating and an inner pipe is diametrically contracted by cooling with a coolant introduced into the inner pipe to produce between the pipes a clearance just sufficient for insertion of the inner pipe into the outer pipe, and then the coolant is pressurized to expand the inner pipe against and together with the outer pipe, the pressure being removed after the pipes have expanded to a specific diameter of the joint therebetween. The tightness of the fit between the pipes due to the expansion is further increased by the subsequent thermal shrinkage of the outer pipe and thermal expansion of the inner pipe.

8 Claims, 12 Drawing Figures

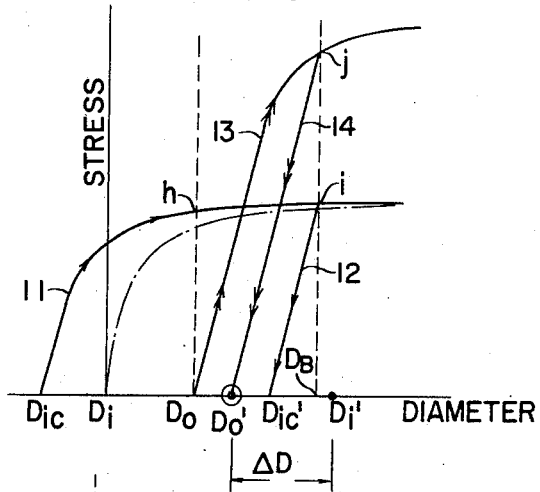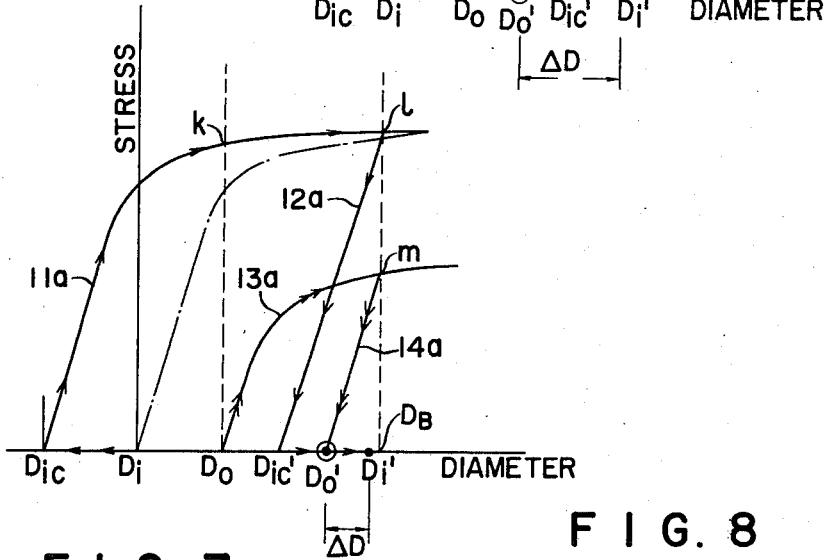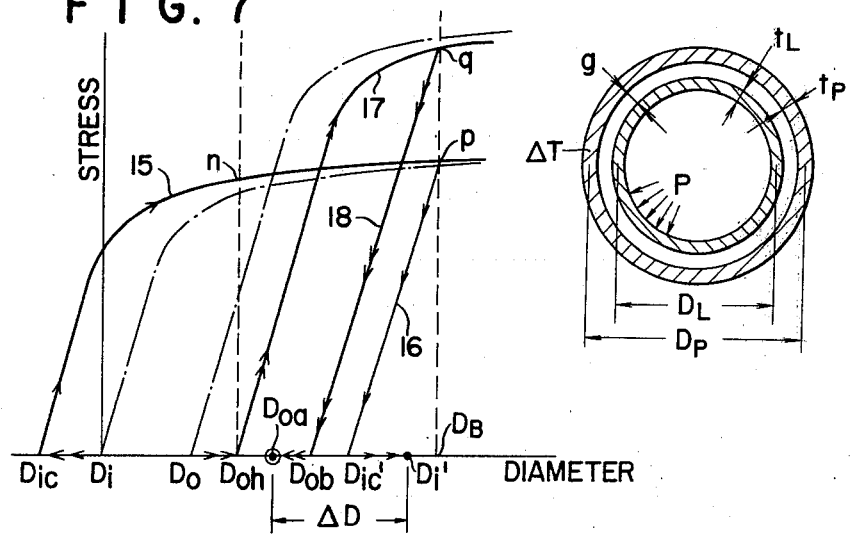

F I G. 10
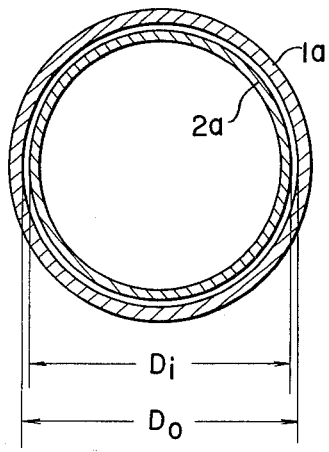
F I G. 12
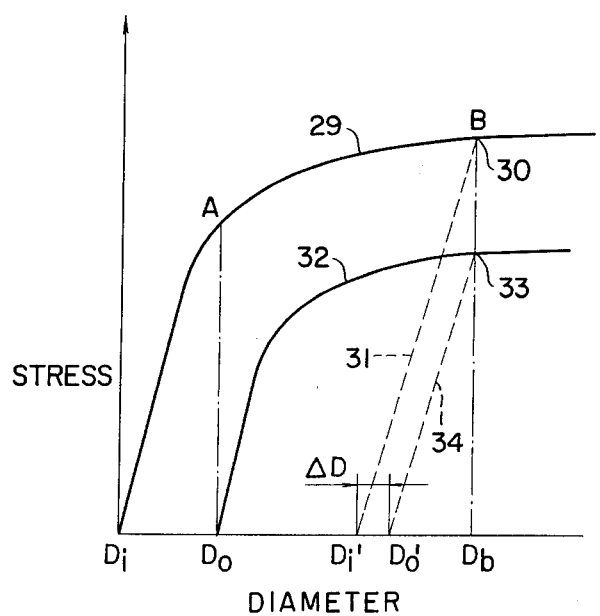

METHOD OF PRODUCING MULTIPLE-WALL COMPOSITE PIPES

BACKGROUND OF THE INVENTION

This invention relates generally to the production of composite metal pipes having laminated multiple walls (hereinafter referred to as double-wall pipes) and used as chemical plant pipes, oil and gas well pipes, oil and gas line pipes, heat-exchanger tubes, and the like. More particularly, the invention relates to a method of producing double-wall pipes in which an inner pipe at one temperature is inserted in an outer pipe at another temperature, and, with these pipes in this state, pressure is applied to the interior of the inner pipe thereby to cause it to expand and to conformably adhere and be tightly joined to the outer pipe when both pipes assume substantially the same temperature.

Multiple-wall pipes such as double-wall pipes are being adopted for use as piping in chemical plants, oil and gas wells, and oil and gas pipelines, and as tubing in heat exchangers, apparatuses, and the like for the purpose of improving performance in preventing rust and withstanding corrosion. This trend is increasing with the recent development of the technology in fluid transportation.

Among the pipes of this character known heretofore for transporting fluids such as those containing corrosive substances, there is a double-wall pipe in which the inner pipe or liner tube is made of a corrosion-resistant material for effective handling of the corrosive fluid, while the outer pipe is designed to provide strength to withstand internal pressures. For example, there is a double-wall pipe comprising a stainless-steel inner pipe and a carbon-steel outer pipe in which the inner pipe is fitted.

Double-wall pipes of this character in which the inner and outer pipes are joined together with ample tightness are being developed.

The reasons for the necessity of ample tightness of joint, in general, in a double-wall pipe of this type may be considered to be as follows. One reason is that, in general, the temperature of a fluid in the interior of the pipe is different from that of a fluid outside of the pipe in many cases, and, in the case where it is desirable to reduce this temperature difference as much as possible by imparting high heat conductivity between the inner and outer pipes, it is preferable that the inner and outer pipes be adhering to each other with maximum possible force.

Another reason for the necessity of a tight joint is that, since the inner and outer pipes are made of different materials, in general, and have different coefficients of thermal expansion, in the case where temperature variations occur in the inner and outer pipes, the difference in the coefficients of thermal expansion or thermal contraction will tend to give rise to trouble such as slippage between the inner and outer pipes, local buckling, stress concentration, and fatigue rupture unless the two pipes are joined suitably with ample tightness thereby to cause the inner and outer pipes to behave as an integral structure.

As production methods for obtaining such a tight joint between the inner and outer pipes, the thermal shrink-fit method and the pipe-expanding method or hydraulic-expansion method are known. In the shrink-fit method, the outer pipe, the diameter of which is smaller than that of the inner pipe when both pipes are at the same temperature, is heated to be enlarged and the inner pipe is inserted therein. Then it is allowed to cool and shrink thereby to be tightly fitted onto the inner pipe. In the hydraulic expansion method, the inner pipe is inserted in the outer pipe and filled with a liquid, which is then pressurized to cause the inner pipe to expand and undergo a plastic deformation to be fitted tightly in the outer pipe.

However, both of these methods are accompanied by certain problems in the fabrication of the double-wall pipe and in their performance during use as described below and hereinafter.

In the thermal shrink-fit method, fundamentally, there are tolerances in the thicknesses of the inner and outer pipes, and the existence of out-of-roundness cannot be avoided with the pipes are produced by an ordinary process. Consequently, it is impossible in actual practice to carry out joining by the thermal shrink-fit method with a temperature difference of 400° to 500° C. with pipes in the asdelivered state. One measure which would appear to be possible for overcoming this problem is to machine the cylindrical outer and inner surfaces to be joined of the inner and outer pipes beforehand by a process such as machine grinding and polishing and then to carry out the thermal shrink fitting. This measure, however, is disadvantageous because of the required great labor and the resulting high cost.

In the case of pipe of long unit lengths, particularly those of thin walls, it is very difficult technically to obtain such a high precision in its dimension uniformly over the length of each pipe, and the production cost would be remarkably high.

Another problem encountered in this thermal shrink-fit method is the necessity of maintaining the temperature difference between the pipes uniform in the longitudinal direction of the pipes during this process. This method becomes difficult again in the case of pipes of long unit lengths and is ordinarily limited to the production of pipes of short unit lengths.

In the above mentioned hydraulic expansion method, as the pressure in the inner pipe is increased, the inner pipe expands until it contacts the outer pipe, and then, as the pressure is further increased, the two pipes are expanded unitarily until the stress in the outer pipe is near its yield point. The pressure is then reduced, whereupon both pipes shrink or contract elastically and, if they were free or independent of each other, would assume respective free states. If, in these free states, the outer diamenter of the inner pipe is greater than the inner diameter of the outer pipe, the tightening effect will be positive, and the two pipes will be securely joined together as desired. However, if, in these free states, the outer diameter of the inner pipe is less than the inner diameter of the outer pipe, the tightening effect will be negative, and there will be no tight joining of the pipes.

Whether or not a positive tightening effect will be produced depends on the mechanical properties of the materials and the sizes of the two pipes as will be described more fully hereinafter in conjunction with drawings including graphs. Thus, this hydraulic expansion method is subject to restriction of materials and their combinations.

SUMMARY OF THE INVENTION

It is an object of this invention to provide a novel and effective method of producing double-wall pipes in which the above described problems encountered in the conventional methods are overcome, and which, in a broad aspect thereof, is characterized by the steps of causing an outer pipe and an inner pipe inserted in the outer pipe to have a temperature difference therebetween, applying pressure to the interior of the inner pipe thereby to cause the inner pipe to expand against the outer pipe, and thereafter to remove the pressure and the temperature difference between the two pipes thereby to tightly join the pipes.

According to this invention in one specific mode of practice thereof, the abovesaid temperature difference is imparted by heating the outer pipe.

According to this invention in another specific mode of practice thereof, the abovesaid temperature difference is imparted by cooling the inner pipe.

According to this invention, in still another specific mode of practice thereof, the abovesaid temperature difference is imparted by heating the outer pipe and cooling the inner pipe.

The nature, utility, and further features of this invention will be more clearly apparent from the following detailed description with respect to preferred embodiments of the invention when read in conjunction with the accompanying drawings.

BRIEF DESCRIPTION OF THE DRAWINGS

In the drawings:

FIG. 5 is a graph indicating relationships between stress and diameter concerning the mode of practice shown in FIG. 4;

FIG. 6 is a graph similar to FIG. 5 indicating other relationships between stress and diameter concerning the mode of practice shown in FIG. 4;

FIG. 7 is a graph similar to FIG. 5 indicating relationships between stress and diameter concerning still another mode of practice of this invention;

FIG. 8 is a cross-sectional view of combined inner and outer pipes for a quantitative analysis;

FIG. 10 is a cross-sectional view of an inner pipe inserted in an outer pipe for a description of the general nature and limitations of the conventional hydraulic-expansion method; and FIGS. 11 and 12 are graphs respectively corresponding to FIGS. 2 and 3 but relating to the conventional hydraulic-expansion method.

DETAILED DESCRIPTION

As conducive to a full understanding of this invention, the general nature and limitations of the conventional hydraulic-expansion method will first be briefly described with reference to FIGS. 10, 11, and 12.

An inner pipe $2a$ of relatively low strength (low yield point) having an outer diameter $D_i$ is inserted with sufficient clearance for insertion into a relatively high-strength (high-yield point) outer pipe $1_a$ having an inner diameter $D_o$ as shown in FIG. 10. The inner pipe $2_a$ is then filled with a suitable liquid, the pressure of which is progressively increased. As a consequence, the inner pipe $2_a$ progressively expands as indicated by the lower part of a curve 21 shown in the upper part of FIG. 11 until the inner pipe $2_a$ contacts the outer pipe $1_a$ at a point A corresponding to the inner diameter $D_o$ of the outer pipe $1_a$. As the internal pressure is further increased, the outer diameter of the inner pipe $2_a$ (and the inner diameter of the outer pipe $1_a$) increases as indicated by the curve 21 until a point B near the yield point of the outer pipe $1_a$ is reached, at which point B, the diameter of the joint between the two pipes is $D_b$. The internal pressure is then gradually reduced. As a consequence, the composite pipe contracts as indicated by a curve 22 until at zero pressure (gauge), the diameter of the joint between the two pipes becomes D.

Figure 11:
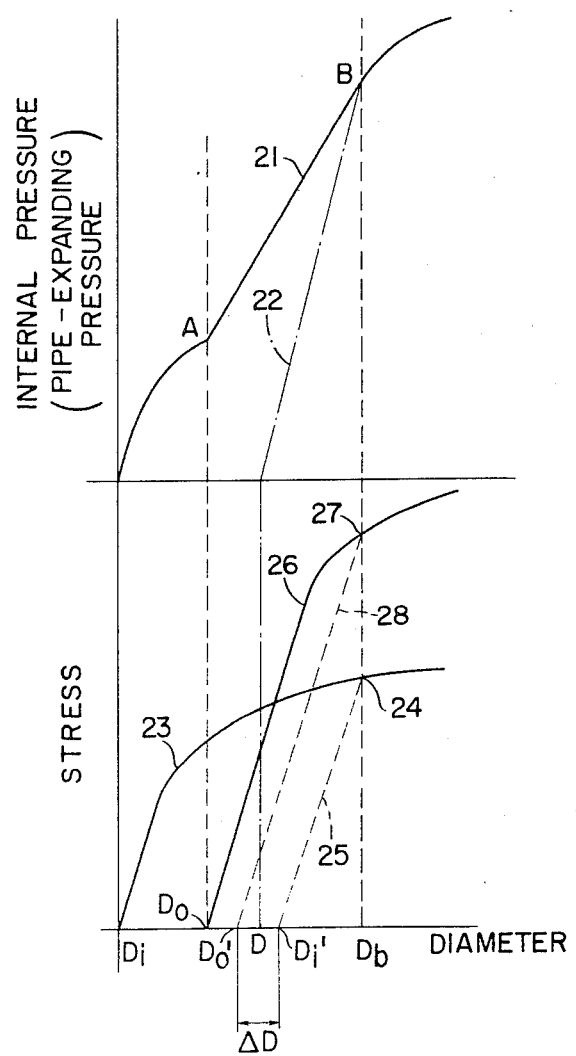

During the above described expansion and contraction, the relationships between the stresses in the two pipes and their diameters are as indicated in the lower part of FIG. 11. More specifically, as the internal pressure is increased the outer diameter of the inner pipe increases from $D_i$, corresponding to zero stress, as indicated by a curve 23 in relation to the stress within the inner pipe until its outer diameter reaches the above mentioned value $D_b$ corresponding to the point B, at which the stress-outer diameter relation is indicated at a point 24. Then, as the internal pressure is reduced, the stress-diameter relation of the inner pipe would vary as indicated by a curve 25, if the inner pipe were free, until the outer diameter thereof becomes $D_i'$ at zero stress.

On the other hand, the outer pipe is expanded by the inner pipe from the diameter $D_o$ corresponding to the above mentioned point A as indicated by a curve 26 to a point 27 corresponding to the above mentioned point B. Then, as the internal pressure is decreased to zero, the inner diameter of the outer pipe would decrease as indicated by a curve 28, if the outer pipe were free, to a value $D_o'$ at zero stress.

The above mentioned outer diameter $D_i'$ of the inner pipe is greater than the inner diameter $D_o'$ of the outer pipe by a difference $\Delta D$, which is hypothetical since the two pipes are tightly joined, and their diameters at the joint therebetween, in actuality, are equal at the value D. This difference $\Delta D$ would actually exist if the two pipes were free of each other. This difference $\Delta D$, which is called the "fit-in gap" and is positive in the instant case because the yield point of the outer pipe is higher than that of the inner pipe as will be appreciated by comparison of the curves 23 and 26, represents the degree of tightness of the fit between the two pipes.

The application of the hydraulic-expansion method to the case where the stress-strain relationships of the materials of the inner and outer pipes are as indicated by curves 29 and 32, respectively, in FIG. 12, wherein the yield point of the material of the inner pipe is higher than that of the outer pipe, will now be considered. As the internal expanding pressure in the inner pipe inserted in the outer pipe is increased, the inner pipe expands along the curve 29 from a diameter $D_i$ at zero stress to a diameter $D_o$, corresponding to a point A on the curve 29, from which the outer pipe is also expanded along the curve 32.

Then, when the inner and outer pipes respectively reach points 30 and 33 corresponding to a diameter $D_b$, the internal pressure is reduced to zero. As a consequence, the inner and outer pipes respectively contract along curves 31 and 34 until, at zero stress, the outer diameter of the inner pipe and the inner diameter of the outer pipe are $D_i'$ and $D_o'$, respectively, $D_i'$ being less than $D_o'$. Consequently, the "fit-in gap" $\Delta D$ is negative, which means that a clearance of $\Delta D$ results between the two pipes, whereby there is no tight joint therebetween, and production of a double-wall pipe is impossible.

That is, the conventional pipe-expanding method is restricted to the condition that the yield point of the outer pipe be higher than that of the inner pipe. In other words, this method is restricted in its selection of pipe materials and combinations thereof.

Figure 1:
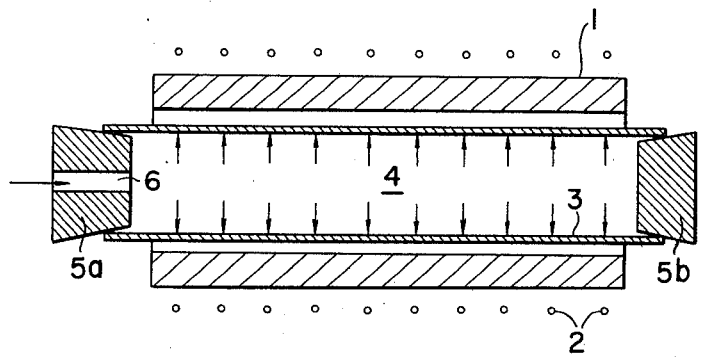
FIG. 1 is a side view, in longitudinal section, illustrating one mode of practice of this invention.
Figure 2:
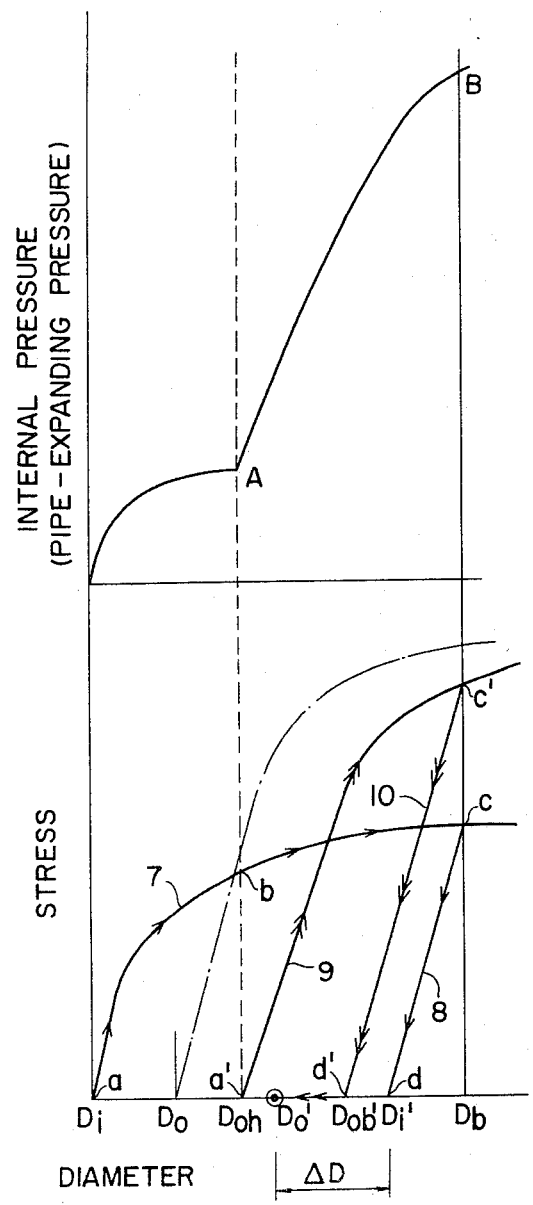
FIG. 2 is a graph in two parts respectively indicating relationships between internal pressure (i.e., pipe-expanding pressure) and diameter and between stress and diameter concerning the mode of practice illustrated in FIG. 1.

In a first embodiment of this invention, the yield point of the outer pipe 1 is higher than that of the inner pipe 2. The outer pipe 1 as shown in FIG. 1 is an ordinary pipe made of carbon steel. It has a plate thickness tolerance of average magnitude and also has some out-of-roundness. It is a steel pipe which has not been subjected specially to any secondary processing such as machine grinding or polishing. Its original inner diameter prior to heating is denoted by $D_o$ as shown in FIG. 2.

A suitable coil heater 2 is wound around the outer pipe 1 over its entire length. When a specific electric current is passed through this coil heater 2 under specific conditions, the outer pipe 1 is heated to a specific temperature at which the inner diameter thereof is $D_{oh}$ as indicated in FIG. 2.

A stainless-steel inner pipe 3 of an original outer diameter denoted by $D_i$, which is smaller than the original inner diameter $D_o$ of the outer pipe 1, is inserted into the outer pipe 1 at the above mentioned increased inner diameter $D_{oh}$. The two ends of the inner pipe 3 are closed by means which are symbolically represented by plugs $5_a$ and $5_b$. One of the plugs, $5_a$, is provided with a port 6 through which water is introduced as a pressure transmitting medium into the interior 4 of the inner pipe 3 and is pressurized. As a consequence, the inner pipe 3 expands diametrically as indicated by a stress-strain curve 7 in FIG. 2 from the point of origin "a" through a point "b" to a point "c".

When, during this expansion of the inner pipe 3, its outer diameter reaches the point "b", its outer surface contacts the inner surface of the outer pipe 1, whose inner diameter is at the above mentioned value $D_{oh}$. As the internal water pressure is further increased, the outer diameter of the inner pipe 3 increases from "b" to "c". At the same time, the outer pipe 1 is expanded in unison as indicated by a stress-strain curve 9 from a point "a'" corresponding to the diameter $D_{oh}$ to a point "c'" corresponding to the above mentioned point "c" and a diameter value of $D_b$. Since the yield point of the inner pipe is lower than that of the outer pipe, the slope of the curve 7 of the inner pipe decreases more rapidly as the stress increases than that of the curve 9 of the outer pipe. Consequently, the curve 7 crosses the curve 9 at a point between the points "b" and "c".

Then, at the points "c" and "c'", at which the diameters of the pipes at their interface are at the value $D_b$, the internal pressure is reduced to zero (gauge), whereupon the stress-strain relationship of the inner pipe 3 varies as indicated by a curve 8 from the point "c" to a point "d".

That is, the outer diameter of the inner pipe 3 decreases from $D_b$ to $D_i'$. At the same time, the stress-strain relationship of the outer pipe 1 varies as indicated by a curve 10 from the point "c'" to a point "d'", the inner diameter of the outer pipe 1 decreasing from $D_b$ to $D_{ob}'$.

Then, when the outer pipe 1 is allowed to cool naturally, its inner diameter tends to further decrease from $D_{ob}'$ to $D_o'$. Consequently, a fit-in gap $\Delta D$ is established between the inner pipe 3 and the outer pipe 1.

Figure 3:
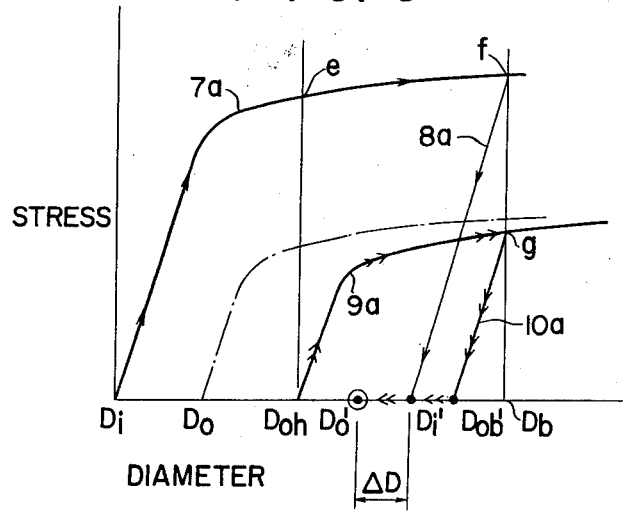
FIG. 3 is a graph indicating other relationships between stress and diameter concerning the mode of practice illustrated in FIG. 1.

In the case where, conversely to that of the above described embodiment of the invention, the yield point of the inner pipe is higher than that of the outer pipe, as indicated in FIG. 3, the outer pipe of a specific material is first heated to a specific temperature, thereby expanding the inner diameter of the outer pipe from $D_o$ to $D_{oh}$. Then the inner pipe of a specific material and an outer diameter $D_i$ smaller than the inner diameter $D_o$ of the outer pipe is inserted into the outer pipe of thermally expanded diameter.

Then, when a fluid medium for applying pressure is introduced into the inner pipe and is pressurized, the inner pipe expands as indicated by a curve $7_a$ in FIG. 3 from the origin through a point "e" to a point "f", which correspond respectively to diameters $D_i$, $D_{oh}$, and $D_b$. When the inner pipe is thus expanded to the point "e", its outer surface contacts the inner surface of the outer pipe with the above mentioned inner diameter $D_{oh}$. Then as the pressure is further increased, the inner pipe is expanded from "e" to "f". At the same time the outer pipe is also expanded as indicated by a curve $9_a$ from $D_{oh}$ to a point "g" so that its inner diameter increases from $D_{oh}$ to $D_b$.

Then, at the points "f" and "g" corresponding to the diameter $D_b$, the increasing of the internal pressure is stopped, and the pressure is reduced to zero (gauge), whereupon the inner pipe contracts as indicated by a curve $8_a$ from the point "f", whereby its outer diameter decreases from $D_b$ to $D_i'$. At the same time, the outer pipe contracts as indicated by a curve $10_a$ from the point "g", whereby its inner diameter decreases from $D_b$ to $D_{ob}'$.

Then, when the outer pipe is allowed to cool naturally, it shrinks further and tends to assume an inner diameter of $D_o'$. Consequently, a positive interference $\Delta D$ as shown in FIG. 3 is obtained between the inner and outer pipes.

This invention can be practiced in a wide variety of modes. For example, the heating means is not limited to a coil heater 2 but may be any of various other means. The means for expanding the inner pipe may also take any of other forms.

The above described embodiment of this invention is characterized by the steps of causing an inner pipe to be in a relatively overlapped and laminated disposition within an outer pipe, heating the outer pipe and causing it to expand either prior to or after insertion of the inner pipe therein, imparting a pipe expanding action to the interior of the inner pipe thus inserted, and causing the outer pipe to cool and shrink. Accordingly, the method of this invention differs from the conventional thermal shrink-ft method wherein, in order to obtain fundamentally a fit-in gap, a precise machine finishing over the entire length of the pipes is required. In the practice of this invention, a desired combination of steel pipes or the like with tolerances of wall thicknesses and diameters respectively of the inner and outer pipes becomes possible. In addition, pretreatment such as polishing and grinding are also unnecessary, and steel pipes generally sold on the market can be used directly as they are. Thus, the method of producing double-wall pipes of this invention is very economical.

Differing from the known hydraulic-expansion method, the method of this invention is not restricted in the selection of combinations of material properties such as the restrictive requirement that the yield point of the outer pipe be greater than that of the inner pipe, whereby the invention is not influenced by the yield points of the materials and a wide range of combinations can be used.

Another advantageous feature of this invention is that, by varying the heating temperature, the fit-in gap for tightness can be selected at will, thereby the tightening force can be readily and freely controlled.

Furthermore, the heating and cooling of the outer and inner pipes can be readily carried out uniformly over their entire length. Accordingly, the mutual tightening effect of the inner and outer pipes due to their thermal shrinkage and thermal expansion can be made uniform, whereby there are no irregularities in the product precision, and the double-wall pipes can be produced with high yield.

Figure 4:
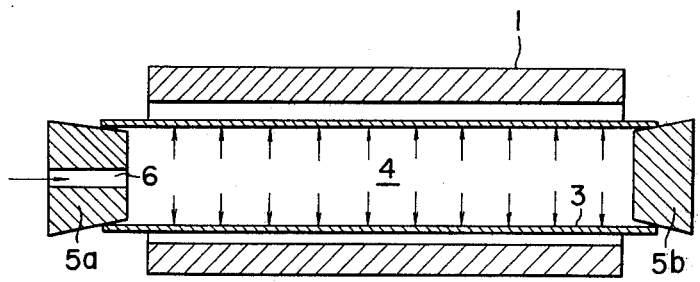
FIG. 4 is a side view, similar to FIG. 1, illustrating another mode of practice of this invention.

In another embodiment of this invention as indicated in FIG. 4, the yield point of the outer pipe 1 is higher than that of the inner pipe 3. In this example, the outer pipe 1 is an ordinary pipe made of carbon steel. It has a plate thickness tolerance of average magnitude and out-of-roundness and has not be subjected to any special secondary processing such as machine grinding or polishing. The inner diameter of the outer pipe 1 is $D_o$ as indicated in FIG. 5. In FIG. 4 those parts which are the same as corresponding parts in FIG. 1 are designated by like reference numerals.

Then, a stainless-steel inner pipe 3 of an outer diameter $D_i$ smaller than the inner diameter $D_o$ of the outer pipe 1 is inserted into the outer pipe 1. The ends of this inner pipe 3 are closed by means $5_a$ and $5_b$, and through an opening 6 in one closing means, $5_a$, alcohol cooled with dry ice, for example, is introduced into the interior 4 of the inner pipe 3 thereby to cool the inner pipe. As a consequence, the inner pipe 3 contracts, and its outer diameter becomes $D_{ic}$ as shown in FIG. 5.

Then, as the inner pipe 3 is maintained at the lowered temperature, the alcohol is pressurized and used doubly as a pressure transmitting medium, whereupon the inner pipe 3 expands as indicated by a curve 11 from the zero stress point through a point "h" to a point "i". When, during this expansion, the point "h" is reached, the outer diameter of the inner pipe 3 becomes $D_o$, and the outer surface of the inner pipe contacts the inner surface of the outer pipe 1. Then, as the internal pressure is further increased, the inner pipe 3 expands from the point "h" to the point "i". Simultaneously, the outer pipe 1 is forced to expand from a point corresponding to the diameter $D_o$ to a point "j". The terminal point "i" and "j" correspond to a diameter $D_B$.

Then, when the pressure increase is stopped, and the pressure is reduced to zero, the outer diameter of the inner pipe 3 decreases as indicated by a curve 12 from $D_B$ to $D_{ic}'$, while the inner diameter of the outer pipe 1 decreases as indicated by a curve 14 from $D_B$ to $D_o'$.

Then, when the cooling medium used doubly as a pressure transmitting medium is discharged out of the inner pipe 3, its outer diameter tends to increase from $D_{ic}'$ to to $D_i'$. As a result, a positive fit-in gap $\Delta D$ is fromed between the inner pipe 3 and the outer pipe 1 as indicated in FIG. 5.

In the case where, conversely to the above described case, the yield point of the inner pipe is higher than that of the outer pipe as indicated in FIG. 6, the inner pipe of a specific material is first cooled to a specific temperature. The inner pipe thereby shrinks so that its outer diameter decreased from $D_I$ to $D_{ic}$ and, in that state, is inserted into the outer pipe.

A pressure applying liquid is then introduced into the interior of the inner pipe, which thereupon expands as indicated by a curve $11_a$ in FIG. 6 from a zero-stress point at $D_{ic}$ through a point "k" to a point "l". When, during this expansion, the point "k" is reached, the outer surface of the expanding inner pipe contacts the inner surface of the outer pipe, that is, reaches the inner diameter $D_o$ of the outer pipe. Then, as the internal pressure is further increased, the inner pipe expands to the state indicated by the point "l" where its outer diameter is $D_i'$. At the same time, the outer pipe expands as indicated by a curve $13_a$ from the zero-stress point at $D_o$ to a point "m" where the inner diameter of the pipe is also $D_i'$.

Then, with the two pipes respectively in these states, the internal pressure is reduced to zero (gauge), whereupon the inner pipe contracts as indicated by a curve $12_a$, its outer diameter decreasing from $D_B$ to $D_{ic}'$, while the outer pipe also contracts as indicated by a curve $14_a$, its inner diameter decreasing from $D_B$ to $D_o'$.

Then, when the inner pipe is caused to undergo thermal expansion similarly as in the above described example, its outer diameter increases from $D_{ic}'$ to $D_i'$. As a result, a positive fit-in gap $\Delta D$ as indicated in FIG. 6 is obtained between the inner and outer pipes.

The method of this invention can be practiced in a variety of modes. The means for cooling the inner pipe is not limited to alcohol cooled by dry ice, there being various other cooling means such as liquid nitrogen.

The above described embodiment of the invention is characterized by the steps of placing the inner pipe in an overlapped and laminated state relative to the outer pipe, cooling the inner pipe to cause it to shrink either prior to or after the foregoing step, imparting a pipe expanding action to the interior of the inserted inner pipe, and then causing the inner pipe to undergo thermal expansion. As a result, the aforedescribed advantageous features of the first embodiment of the invention are attained by the instant embodiment.

In the instant embodiment of this invention, the fit-in gap between the two pipes can be freely varied by varying the cooling temperature for causing thermal shrinkage of the inner pipe. Accordingly the tightening force between the pipes can be controlled at will.

In the instant case, the inner pipe can be easily caused to undergo uniform thermal shrinkage over its entire length, whereby the tightness of the fit between the two pipes due to the thermal expansion of the inner pipe relative to the outer pipe is uniform. Accordingly, similarly as in the first embodiment of the invention, there are no irregularities in the product precison, and the product yield is high.

A third embodiment of this invention will now be described with respect to the case wherein the yield point of the outer pipe is higher than that of the inner pipe. This example of practice may be schematically illustrated by the same FIG. 1 used hereinbefore in conjunction with the first embodiment of the invention. Similarly as in the preceding embodiments, an ordinary carbon-steel outer pipe 1 of an inner diameter $D_o$ prior to heating as shown in FIG. 7 and a stainless-steel inner pipe 3 of an initial diameter $D_i$ smaller than the diameter $D_o$ are to be joined together.

A coil heater 2 is wound around the outer pipe 1 over its entire length to heat the outer pipe to a specific temperature at which the inner diameter thereof is $D_{oh}$ as indicated in FIG. 7. The inner pipe 3 is inserted into the outer pipe 1.

Cold water to function doubly as a coolant and a pressure applying medium is introduced into the interior of the inner pipe 3, the diameter of which is thereby reduced to $D_{ic}$. Then the cooling of the inner pipe 3 and the heating of the outer pipe 1 are stopped, and the internal pressure of the inner pipe is increased, whereupon the inner pipe expands as indicated by a curve 15 from the zero-stress point at the diameter $D_{ic}$ through a point "n" to a point "p" at which the diameter is $D_B$.

During this process, when the expansion of the inner pipe 3 reaches the point "n", its outer diameter becomes equal to $D_{oh}$, and its outer surface contacts the inner surface of the outer pipe 1. Then as the internal pressure within the inner pipe 3 is increased further, the inner pipe 3 expands to the point "p", and, at the same time, the outer pipe 1 is forced to expand as indicated by a curve 17 from the zero-stress point at $D_{oh}$ to a point "q" corresponding to the above mentioned diameter $D_B$.

Then, with the two pipes in this state, the water pressure is reduced to zero, whereupon the inner pipe 3 shrinks as indicated by a curve 16, its outer diameter tending to decrease from $D_B$ to $D_{ic}'$. At the same time, the outer pipe 1 shrinks as indicated by a curve 18, its inner diameter tending to decrease from $D_B$ to $D_{ob}$.

Then, when the cold water is discharged out of the inner pipe 3, its outer diameter tends to increase from $D_{ic}'$ to $D_i'$. When the outer pipe 1 is allowed to cool naturally, it undergoes thermal shrinkage, and its diameter tends to decrease further from $D_{ob}$ to $D_{oa}$. Accordingly, a positive fit-in gap $\Delta D$ as indicated in FIG. 7 is obtained between the inner pipe 3 and the outer pipe 1.

It is to be understood that the instant embodiment of the invention is not limited to the above described relationship between the yield points of the inner and outer pipes but is applicable with equal effectiveness to the case where the yield point of the outer pipe is lower than that of the inner pipe.

The above described example of practice of the invention is characterized by the steps of placing the inner pipe in a state of overlapped and laminated state relatively within the outer pipe, carrying out, prior to or after the foregoing step, a first process of heating the outer pipe to cause it to expand and a second process, independent of the first process of cooling the inner pipe to cause it to shrink, thereafter imparting an expanding action to the inner pipe, thereafter causing the outer pipe to undergo thermal shrinkage, and causing the inner pipe to undergo thermal expansion. As a result, the aforedescribed advantageous features of the first embodiment of the invention are attained by the instant embodiment.

In the practice of this third embodiment of the invention, the fit-in gap, and therefore the tightness of the fit, between the inner and outer pipes can be freely controlled by adjustably varying the temperature to which the outer pipe is heated and that to which the inner pipe is cooled. In the instant case, also, heating and cooling of the outer and inner pipes can be carried out uniformly over their entire length.

While this invention has been described above with respect to embodiments thereof in each of which two pipes are fitted together to form a double-wall pipe, it will be apparent that the principle of this invention can be advantageously applied to other multiple-wall composite pipes formed from more than two pipes.

In order to indicate more fully the utility of this invention, the advantages of the method of this invention, which may be called a "thermo-hydraulic fit method," over the conventional thermal shrink-fit method and hydraulic-expansion method will now be analyzed quantitatively with reference to FIG. 8.

The fit-in stress $\sigma_{FL}$ (hoop compression stress in the circumferential direction) imparted to the inner pipe of the double-wall pipe as a product in each of the methods is represented as follows.

Thermal shrink-fit method:

$$\sigma_{FL} = \frac{t_P E_P E_L}{t_P E_P + t_L E_L}\left(\alpha_P \Delta T - \frac{g}{D}\right)$$

Hydraulic-expansion method:

$$\sigma_{FL} = \frac{E_L}{t_P E_P + t_L E_L}\left\{\frac{DP}{2} - t_L \sigma_{YL}\left(1 + \frac{E_P}{E_L}\right)\right\}$$

Thermo-hydraulic fit method:

$$\sigma_{FL} = \frac{E_L}{t_P E_P + t_L E_L}\left\{\frac{DP}{2} - t_L \sigma_{YL}\left(1 + \frac{E_P}{E_L}\right) + t_P E_P \alpha_P \Delta T\right\}$$

where:

$\Delta T$ is the outer pipe heating temperature;

P is the pipe-expanding internal pressure;

D is pipe diameter (assumption: $D_P \approx D_L \approx D$; $D_P$ ... outer pipe diameter, $D_L$ ... inner pipe diameter)

g is the gap or clearance between the pipes when the inner pipe is inserted;

$t_L$ and $t_P$ are wall thicknesses of the inner and outer pipes, respectively;

$E_L$ and $E_P$ are the Young's moduli of the two pipes, respectively;

$\sigma_{YL}$ and $\sigma_{YP}$ are the yield points of the two pipes, respectively; and $\alpha_P$ is the coefficient of thermal expansion of the outer pipe.

From the above equations, the conditions for introduction of fit-in stress ($\sigma_{FL} > 0$) are as follows for the three methods.

Thermal shrink-fit method:

$$\Delta T > \frac{g}{\alpha_P D}$$

Hydraulic-expansion method:

$$P > \frac{2 t_L \sigma_{YL}}{D}\left(1 + \frac{E_P}{E_L}\right)$$

Thermo-hydraulic fit method:

$$\Delta T > \frac{1}{\alpha_P t_P E_P}\left\{ t_L \sigma_{YL}\left(1 + \frac{E_P}{E_L}\right) - \frac{DP}{2} \right\}$$

In one example wherein

Figure 9:
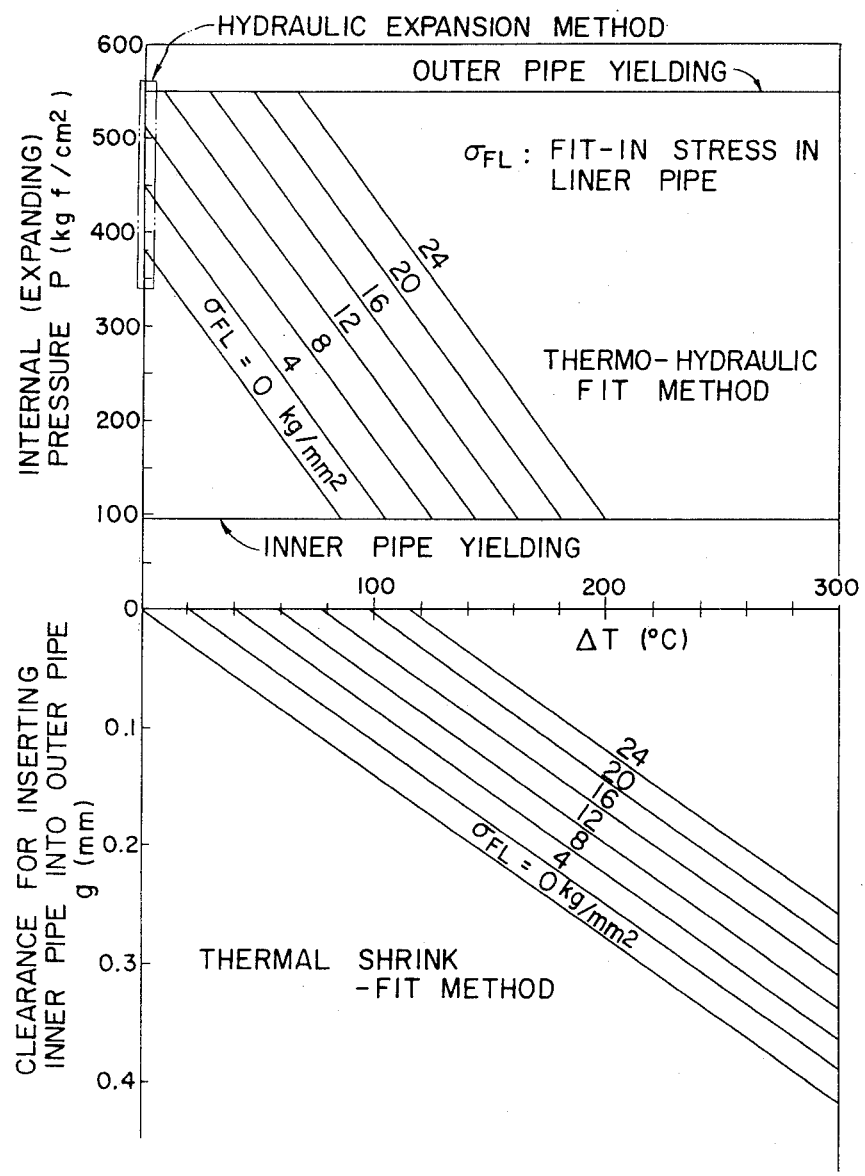
FIG. 9 is a combination of two graphs respectively indicating relationships between internal (expanding) pressure and temperature difference and between clearance for inserting an inner pipe into an outer pipe and temperature difference, each graph being for different fit-in stresses in the inner pipe.

| | |
|---|---|
| D = 100 mmφ | $E_L = E_P$ = 20000 kg/mm² |
| $\sigma_{YL}$ = 24 kg/mm² | $\sigma_{YP}$ = 36 kg/mm² |
| $t_L$ = 2.0 mm | $t_P$ = 6.0 mm |
| $\alpha_P = 14 \times 10^{-6}$/°C. | | results of calculations of fit-in stresses as indicated in the graph of FIG. 9 were obtained. From these results, the following points are apparent.

1. In the hydraulic-expansion method, a high pressure is required for obtaining a specific fit-in stress. Furthermore, there is an upper limit to the pressure because of yielding of the outer pipe, and a high fit-in stress cannot be obtained.
2. In the thermal shrink-fit method, a clearance "g" is necessary for inserting the inner pipe after heating of the outer pipe. In the case of pipes of long unit lengths (6 meters or longer), a clearance of at least 1 mm. is required, and, in order to obtain this clearance, a temperature difference of 500° C. or higher becomes necessary. In addition, high precision is required in the pipe dimension, whereby the method is not practical for long pipes.
3. By the thermo-hydraulic fit method, a high fit-in stress can be obtained with relatively low pressure and low temperature difference, and high precision in pipe dimensions is not required.

We claim:

1. A method of producing a multiple walled composite metal pipe, said pipe being formed of an outer pipe and an inner pipe inserted therein, said respective pipes being initially disposed in radially spaced apart relationship to establish a clearance therebetween, including the steps of:
   (a) heating said outer pipe to an average temperature in excess of that of said inner pipe to establish a temperature differential between the pipes, while maintaining said clearance which causes a small coefficient of heat transfer between the pipes, to thermally expand the outer pipe thereby to increase the clearance;
   (b) introducing fluid pressure into said interior surfaces of said inner pipe and urging said inner pipe to plastically expand into contact with said outer pipe with a designated temperature differential; and
   (c) decreasing the temperature of said outer pipe to cause contraction of the same and decreasing said fluid pressure applied to said inner pipe for urging the inner pipe into compression, permitting each of said pipes to be joined into a composite pipe with a tight fit.

2. A method of producing multiple walled composite pipe according to claim 1, in which the temperature differential is imparted and the clearance is increased by additionally cooling the inner pipe.

3. A method of producing multiple walled composite pipe according to claim 1, in which the fluid pressure is applied by a liquid medium introduced into the inner pipe and pressurized.

4. A method of producing multiple walled composite pipe according to claim 2, in which the fluid pressure is applied by a cold liquid medium introduced into the inner pipe and pressurized to thereby function doubly as a coolant for cooling the inner pipe and as a pressure applying medium.

5. A method of producing multiple walled composite pipe according to claim 3, in which the liquid medium is water.

6. A method of producing multiple walled composite pipe according to claim 4, in which the cold liquid medium is cold water.

7. A method of producing a multiple walled composite metal pipe, including the steps of:
   (a) providing separately an outer pipe and an inner pipe which are to be joined together;
   (b) heating the outer pipe to an average temperature in excess of that of said inner pipe to establish a temperature differential between the pipes;
   (c) disposing the inner pipe into the outer pipe while maintaining said temperature differential and also maintaining a clearance which causes a small coefficient of heat transfer between the pipes;
   (d) introducing fluid pressure into said interior surfaces of said inner pipe and urging said inner pipe to plastically expand into contact with said outer pipe with a designated temperature differential; and
   (e) decreasing the temperature of said outer pipe to cause contraction of the same and decreasing said fluid pressure applied to said inner pipe for urging the inner pipe into compression, thereby permitting each of said pipes to be joined into a composite pipe with a tight fit.

8. A method of producing multiple walled composite pipe according to claim 7, in which the temperature differential is imparted by additionally cooling the inner pipe.

* * * * *